(12) United States Patent
Lafer et al.

(10) Patent No.: US 11,817,972 B2
(45) Date of Patent: Nov. 14, 2023

(54) RECEIVE PATH

(71) Applicant: NXP B.V., Eindhoven (NL)

(72) Inventors: Manuel Lafer, Ottendorf (AT); Wolfgang Küchler, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/504,690

(22) Filed: Oct. 19, 2021

(65) Prior Publication Data

US 2022/0166649 A1    May 26, 2022

(30) Foreign Application Priority Data

Nov. 20, 2020 (EP) ..................................... 20209015

(51) Int. Cl.
*H04L 25/02* (2006.01)
*H04B 1/10* (2006.01)

(52) U.S. Cl.
CPC ....... *H04L 25/0204* (2013.01); *H04B 1/1027* (2013.01); *H04L 25/022* (2013.01); *H04L 25/0212* (2013.01)

(58) Field of Classification Search
CPC .................................................. H04L 25/0204
USPC ......................................................... 375/346
See application file for complete search history.

(56) References Cited

U.S. PATENT DOCUMENTS

| 9,046,591 B1* | 6/2015 | Yang ................... G01C 21/005 |
| 2012/0276921 A1 | 11/2012 | Nemeth et al. |
| 2014/0269389 A1 | 9/2014 | Bukkfejes et al. |
| 2018/0167150 A1 | 6/2018 | Clancy et al. |
| 2018/0254870 A1 | 9/2018 | Dutz et al. |

OTHER PUBLICATIONS

Mani et al., "Direction of Arrival Estimation and Beamforming of Multiple Coherent UWB Signals", 2010 IEEE International Conference on Communications, 2010, pp. 1-5.
Kumar et al., "DOA estimation of IR-UWB signals using coherent signal processing," 2014 IEEE 10th International Colloquium on Signal Processing and its Applications, 2014, pp. 288-291.
IEEE "Standard for Low-Rate Wireless Networks. Amendment 1: Enhanced Ultra Wideband (UWB) Physical Layers (PHYs) and Associated Ranging Techniques," Approved Jun. 4, 2020, 174 pages.

* cited by examiner

*Primary Examiner* — Lihong Yu

(57) ABSTRACT

A receiver comprising: a processing module configured to: receive a first portion of a packet of received signalling from a first antenna; receive a carrier estimate signal; adjust the first portion based on the carrier estimate signal and correlate the signal with an expected code sequence to provide a first correlated signal; a tracking module configured to: receive the first correlated signal and update the carrier estimate signal, wherein the processing module is further configured to: receive a second portion of the packet from a second antenna; adjust the second portion based on the carrier estimate signal and correlate the signal to provide a second correlated signal, and wherein the receive path further comprises a phase calculation module configured to: receive the first and second correlated signals and determine a respective first and second carrier phase and an angle of arrival of the received signalling.

12 Claims, 7 Drawing Sheets

RECEIVE PATH

FIELD

The present disclosure relates to a receive path for determining an angle of arrival of received signalling.

SUMMARY

According to a first aspect of the present disclosure there is provided a receive path for calculating an angle of arrival of received signalling, the receive path comprising:
  a processing module configured to:
    receive a first portion of a packet of the received signalling from a first antenna;
    receive a carrier estimate signal;
    adjust a frequency and/or a phase of the first portion based on the carrier estimate signal to provide a first corrected signal; and
    correlate the first corrected signal with an expected code sequence to provide a first correlated signal;
  a tracking module configured to:
    receive the first correlated signal; and
    update the carrier estimate signal based on the first correlated signal,
  wherein the processing module is further configured to:
    receive a second portion of the packet from a second antenna;
    receive the carrier estimate signal based on the first correlated signal;
    adjust a frequency and/or a phase of the second portion based on the carrier estimate signal to provide a second corrected signal; and
    correlate the second corrected signal with the expected code sequence to provide a second correlated signal,
  and wherein the receive path further comprises a phase calculation module configured to:
    receive the first correlated signal and determine a first carrier phase based on the first correlated signal;
    receive the second correlated signal and determine a second carrier phase based on the second correlated signal; and
    determine an angle of arrival of the packet of the received signalling based on the first carrier phase and the second carrier phase.

A receive path according to the first aspect can advantageously result in simpler receiver systems, for example a receiver system with only a single receive path, which can result in cost and chip area savings. Furthermore, receiver systems with only a single receive antenna (and corresponding receive path) can determine an angle of arrival estimation for a signal received from a transmitter with two transmit antennas.

In one or more embodiments, the receive path may be configured to:
  enable the tracking module during receipt of the first portion such that the tracking module is configured to update the carrier estimation signal; and
  disable the tracking module prior to receipt of the second portion such that the carrier estimate signal remains constant during receipt of the second portion.

In one or more embodiments, the phase calculation module may be configured to:
  determine a first channel impulse response, CIR, based on the first correlated signal and a second CIR based on the second correlated signal;
  determine a first path sample based on the first CIR a second path sample based on the second CIR; and
  determine the first carrier phase based on the first path sample and determine the second carrier phase based on the second path sample.

In one or more embodiments, the phase calculation module may be configured to apply a correction factor to the second carrier phase based on a residual frequency offset error of the tracking module.

In one or more embodiments the phase calculation module may be configured to apply a correction factor to the second CIR or second path sample based on a residual frequency offset error of the tracking module.

In one or more embodiments, the receive path may be configured to:
  receive a reference packet prior to the packet of the received signalling;
  determine a reference carrier frequency offset based on the reference packet; and
  determine the residual frequency offset error based on the reference carrier frequency offset.

In one or more embodiments, the receive path may be configured to:
  receive a transmitter carrier frequency offset from a transmitter;
  determine a receiver carrier frequency offset;
  determine a reference carrier frequency offset based on the transmitter carrier frequency offset and the receiver carrier frequency offset; and
  determine the residual frequency error based on the reference carrier frequency offset.

In one or more embodiments, the receive path may be configured to adjust a frequency of an analog front end by the reference carrier frequency offset. The tracking module may be configured to determine the residual frequency offset error as a carrier frequency offset of the first correlated signal.

In one or more embodiments, the receive path may be configured to:
  store the reference carrier frequency offset; and
  determine the residual frequency offset error as a difference between a carrier frequency offset of the first correlated signal and the reference frequency offset.

In one or more embodiments, the first portion may comprise a synchronisation field and the first correlated signal may respectively comprise a correlated synchronisation signal. The tracking module may be configured to update the carrier estimate signal based on the correlated synchronisation signal.

In one or more embodiments, the phase calculation module may be configured to determine the first carrier phase based on the synchronisation correlated signal.

In one or more embodiments, the first portion may further comprise a further first field and the first correlated signal may respectively comprise a further first correlated signal. The phase calculation module may be configured to determine the first carrier phase based on the further correlated signal.

In one or more embodiments, the first portion may comprise a first part of the synchronisation field and the second portion may comprise a second part of the synchronisation field.

In one or more embodiments, the receive path may be configured to:
  receive the first portion of the packet from a first receive antenna coupled to the receive path and receive the second portion of the packet from a second receive antenna coupled to the receive path; or receive the first portion of the packet from a first transmit antenna of a transmitter configured to transmit the packet and receive the second portion of the packet from a second transmit antenna of the transmitter.

In one or more embodiments, the receive path may be suitable for using in an ultra-wideband receiver.

According to a second aspect of the present disclosure, there is provided a receiver comprising any of the receive paths disclosed herein.

In one or more embodiments, the receiver may comprise the first antenna and the second antenna.

In one or more embodiments, the receiver may be configured to switch a coupling of the receive path from the first antenna to the second antenna prior to receipt of the second portion of the packet.

In one or more embodiments, the receiver may comprise an ultra-wideband receiver.

In one or more embodiments, the receiver may be configured to switch a coupling of the receive path from the first antenna to the second antenna in response to the tracking module being disabled.

According to a further aspect of the present disclosure there is provided a receiver system comprising a plurality of any of the receive paths disclosed herein.

According to a further aspect of the present disclosure there is provided a method for calculating an angle of arrival of a received signal comprising:

receiving a first portion of a packet of the received signalling from a first antenna;
receiving a carrier estimate signal;
adjusting a frequency and/or a phase of the first portion based on the carrier estimate signal to provide a first corrected signal;
correlating the first corrected signal with an expected code sequence to provide a first correlated signal;
update the carrier estimate signal based on the first correlated signal, receiving a second portion of the packet from a second antenna;
receiving the carrier estimate signal based on the first correlated signal;
adjusting a frequency and/or a phase of the second portion based on the carrier estimate signal to provide a second corrected signal;
receiving the first correlated signal and determine a first carrier phase based on the first correlated signal;
receiving the second correlated signal and determine a second carrier phase based on the second correlated signal; and
determining an angle of arrival of the packet of the received signalling based on the first carrier phase and the second carrier phase.

According to a further aspect of the present disclosure there is provided a receive path for calculating an angle of arrival of received signalling, the receive path comprising:

a processing module configured to:
  receive a portion of a packet of the received signal;
  receive a carrier estimate signal;
  adjust a phase and/or frequency of the portion based on the carrier estimate signal to provide a corrected signal; and
  correlate the corrected signal with an expected code sequence to provide a correlated signal;

a tracking module configured to:
  receive the correlated signal; and
  update the carrier estimate signal based on the correlated signal; and a phase calculation module configured to:
  receive the correlated signal from the correlator; and
  determine a carrier phase based on the correlated signal, wherein the receive path is configured to:
  receive, at the processing module, one or more first portions of a packet from a first antenna, the one or more first portions comprising a synchronisation portion;
  receive, at the processing module, a second portion of the packet from a second antenna;
  enable the tracking module during receipt of the synchronisation portion and disable the tracking module prior to receipt of any portions subsequent to the synchronisation portion;
  determine, using the phase calculation module, a first carrier phase of one of the one or more first portions and determine a second carrier phase of the second portion; and
  determine an angle of arrival of the packet of the received signal based on the first carrier phase and the second carrier phase.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which.

DETAILED DESCRIPTION

Figure 1:
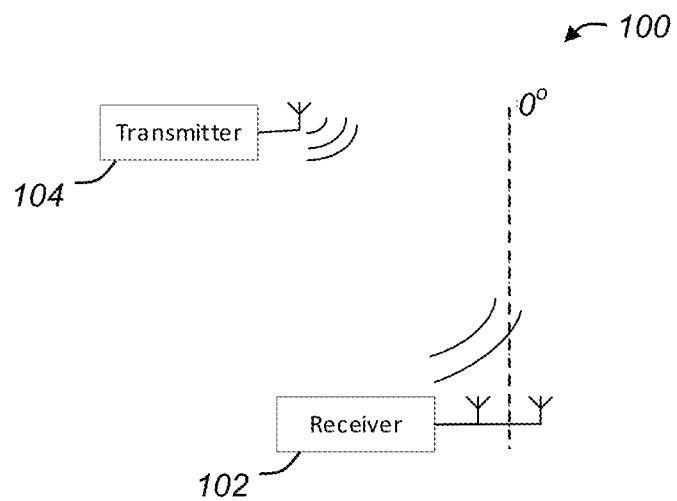
FIG. 1 provides an overview of system for determining an angle of arrival (AoA) estimation.

FIG. 1 provides an overview of a system 100 for determining an angle of arrival (AoA) estimation. The aim of angle of arrival estimation is to find the angle with respect to a receiver 102 from which a transmitter 104 sent a packet. It requires that at least two antennas at known different locations are used for reception (as illustrated) and/or transmission. With two antennas, an angle of −90° to +90° with respect to the 0° reference can be determined. Using more antennas at certain locations can enable extension of the range and also enable the system to determine the angle of arrival in a 3-D coordinate system, e.g. azimuth and elevation.

Figure 2:
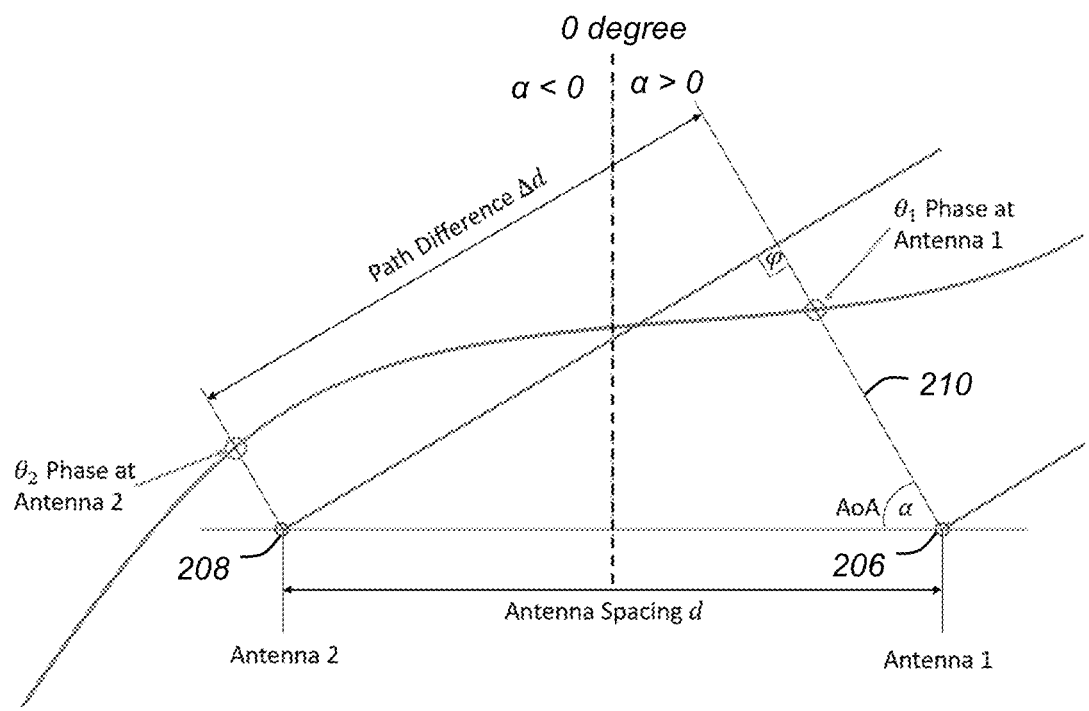
FIG. 2 illustrates a wavefront arriving at a receiver antenna array comprising a first antenna and a second antenna.

FIG. 2 illustrates a wavefront 210 arriving at a receiver antenna array comprising a first antenna 206 and a second antenna 208. It is assumed that a distance, $d_{tx,rx}$, between the transmitter antenna and the receiver antenna array, 206, 208, is much larger than the antenna spacing, d, i.e. $d_{tx,rx} \gg d$. This assumption provides that the incoming wavefront 210 can be depicted by parallel lines arriving at each antenna 206, 208. Therefore, an angle, φ, between the wavefront 210 and a direction vector of the wavefront can be assumed to be 90°. Furthermore, to simplify the description it is assumed that the antenna spacing, d, is less than or equal half the wavelength of the transmission carrier frequency, i.e. $d \leq \lambda/2$. With this assumption, there are no ambiguities in the angle of arrival estimation which have to be resolved using any additional information. For antenna spacings greater than $\lambda/2$, only using the phase difference can result in multiple valid solutions of the angle of arrival estimation and some further information may be required to find the right estimate, e.g. using a compass, gyroscope or additional information extracted from the received signal. The additional information can also come from using more than two antennas. Therefore, the present disclosure is not limited to antenna spacings less than or equal to $\lambda/2$ and the usage of multiple antennas is within the scope of this disclosure. Multiple antennas can be placed in a certain way to be able to resolve the ambiguities as is known in the art.

The wavefront 210 arrives "from the right-hand-side", i.e. from an angle of arrival, α<0, and is first received at the first antenna 206. In other examples, the same angle of arrival could be designated as a negative angle depending on the definition of the angle of arrival, for example a complementary angle to α could be used instead. The incoming signal is depicted as sine wave to illustrate the different phase values at the two antennas 206, 208.

The incoming signal arrives at the first antenna 206 with a first carrier phase, $\theta_1$. The signal has to travel a path difference, Δd, to reach the second antenna 208. The further distance depends on the antenna spacing, d, and the angle of the receiver with respect to the transmitter—the angle of arrival, α. The incoming signal arrives at the second antenna 208 with a second carrier phase, $\theta_2$. A phase difference, Δθ, depends upon the transmission carrier frequency, $f_c$, and the path difference, Δd. From the known antenna spacing, d, and the estimated carrier phases, $\theta_1$, $\theta_2$, the phase difference, Δθ, between the first and second antenna 206, 208 can be calculated as:

$$\Delta\theta = \theta_2 - \theta_1$$

The path difference can be calculated from the phase difference as:

$$\Delta d = \lambda_c * \Delta\theta * \frac{1}{2\pi}$$

where $\lambda_c$ is the carrier wavelength of the incoming signal equal to $c/f_c$, where c is the speed of light. The angle of arrival, α, can be computed using the law of sines with the assumption that φ=90° as:

$$\alpha = \sin^{-1}\left(\frac{\Delta d}{d}\right)$$

Therefore, for an angle of arrival estimation, a receiver system should estimate the phases of the incoming signal at different antenna locations and perform the above calculations to determine the angle of arrival from the phase difference. The receiver system may have to compensate for a frequency offset, Δfo, between a frequency of (a clock of) the transmitter and a frequency of (a clock of) the receiver.

A receiver system may determine a carrier phase as follows. First, a carrier frequency offset and phase error of the received signal is corrected. Following this, the receiver system can correlate the corrected signal and integrate the correlated signal to provide a complex-valued channel impulse response (CIR) estimation. The system can determine carrier phase from the CIR using a complex first path sample. The system can determine the first path sample by applying a first path detection algorithm to the CIR. Advantageously, this allows the receiver system to also determine the phase in non-line of sight (NLOS) conditions. To enable an angle of arrival estimation, the receiver system requires two such complex first path samples received from two different receive antennas.

In a receiver system with multiple physical receive paths (or receive chains), the receive path that detects a signal first may determine the carrier frequency and phase error estimation and a respective tracking loop of the receive path corrects a frequency and phase error by rotating the received signal. The other receive paths can then correct the incoming signal using the same carrier estimation in order to preserve the phase difference information. If every receive path used its own carrier tracking loop, they would all correct their phase errors independently and therefore the phase relationship would be lost.

To enable this angle of arrival estimation, receiver systems may comprise a plurality of antennas for determining an angle of arrival of an incoming signal. The receiver system may include a receive path of signal processing components for each antenna such that the number of receive paths is equal to the number of antennas.

The present disclosure relates to a receiver system which can comprise a number of receive paths that is less than a number of corresponding antennas. The disclosure relates to a receive path which can receive signalling from a plurality of antennas and determine a corresponding angle of arrival. This can advantageously result in simpler receiver systems, for example a receiver system with only a single receive path, which can result in cost and chip area savings. Furthermore, receiver systems with only a single receive antenna (and corresponding receive path) can determine an angle of arrival estimation for a signal received from a transmitter with two transmit antennas.

In one example, with two antennas and one receive path, the receive path can estimate an angle between −90° and +90° from the 0° reference. The setup can be extended arbitrarily, e.g. to two receive chains with two antennas each, i.e. an antenna array of four antennas. Extending the set-up can enable the receiver to distinguish whether the transmitter is in front or behind the receive antenna array.

Figure 3:
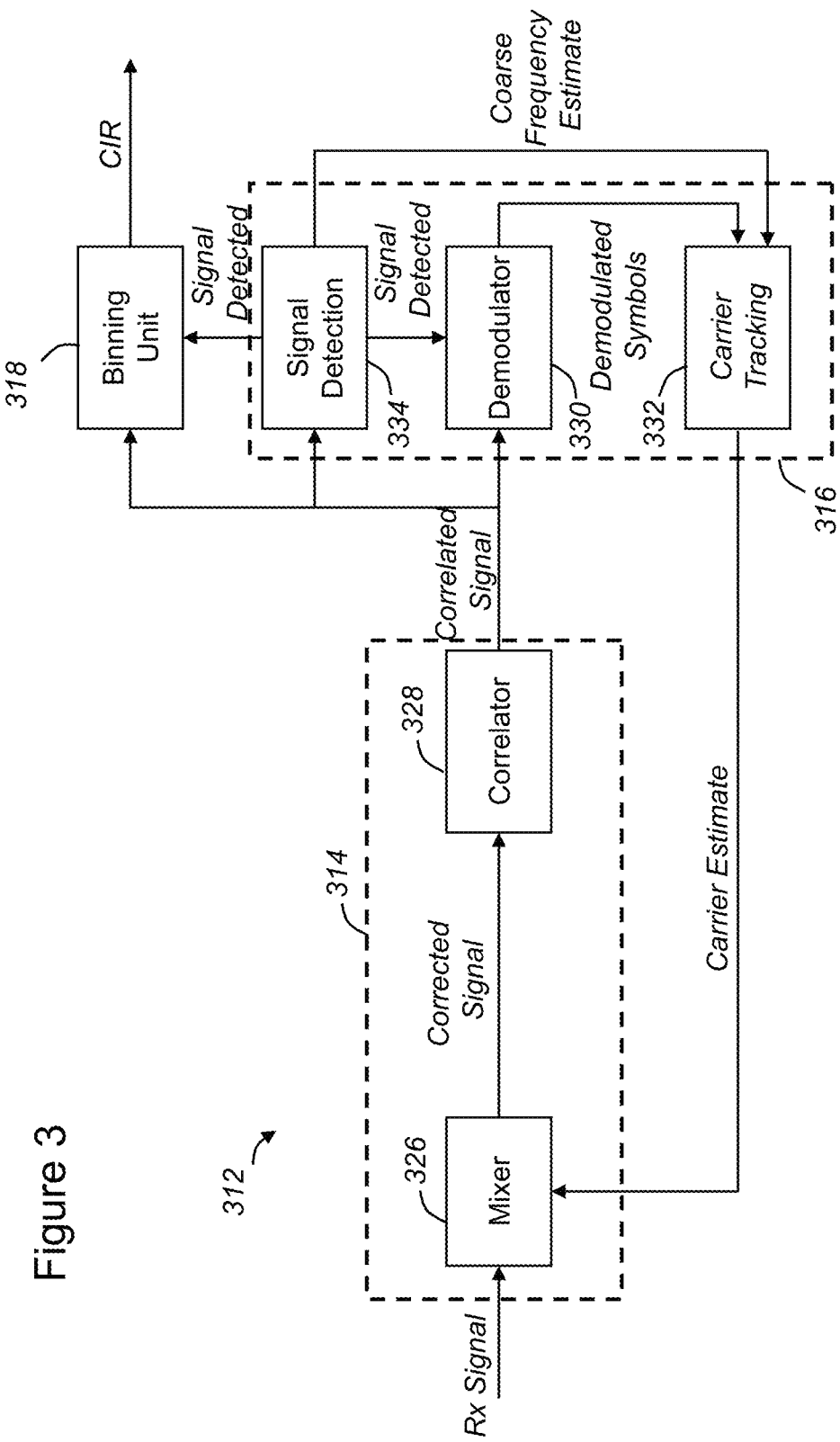
FIG. 3 illustrates a receive path according to an embodiment of the present disclosure.

FIG. 3 illustrates a receive path 312 according to an embodiment of the present disclosure. The receive path 312 comprises a processing module 314, a tracking module 316 and a phase calculation module 318.

The receive path 312 is configured to receive a first portion of a packet (an angle of arrival, AoA, packet) from a first antenna and correct the phase and/or frequency of the first portion using the tracking module 316 in a tracking loop which provides a carrier estimate signal. Following this, the receive path 312 disables or pauses the tracking module 316 (and tracking loop) and receives a second portion of the packet from a second antenna. The phase and or frequency of the second portion is then corrected using the carrier estimate signal calculated for the first portion. The phase calculation module 318 determines: (i) a first carrier phase based on the first portion of the packet received from the first antenna; and (ii) a second carrier phase based on the second portion received from the second antenna. The phase calculation module 318 may determine the first and second carrier phases via integration, CIRs and complex paths as outlined above and described further below. The phase calculation module can determine an angle of arrival based on a difference between the first and second carrier phases as outlined above. As described below, the phase calculation module 318 may apply a residual error correction to the second portion of the packet to determine an accurate angle of arrival estimation.

The carrier estimate signal may comprise an estimate of, or compensation of, a carrier frequency offset and/or a carrier phase offset (error) relative to a clock associated with the receive path. The carrier estimate signal may comprise a combined estimation of carrier frequency offset and carrier phase error or may comprise phase and frequency errors as separate signals. Either way, the processing module can correct both carrier frequency offset and carrier phase error based on the carrier estimate signal. The tracking loop may be 2nd order to correct both phase and frequency with a combined carrier estimate signal.

Figure 4:
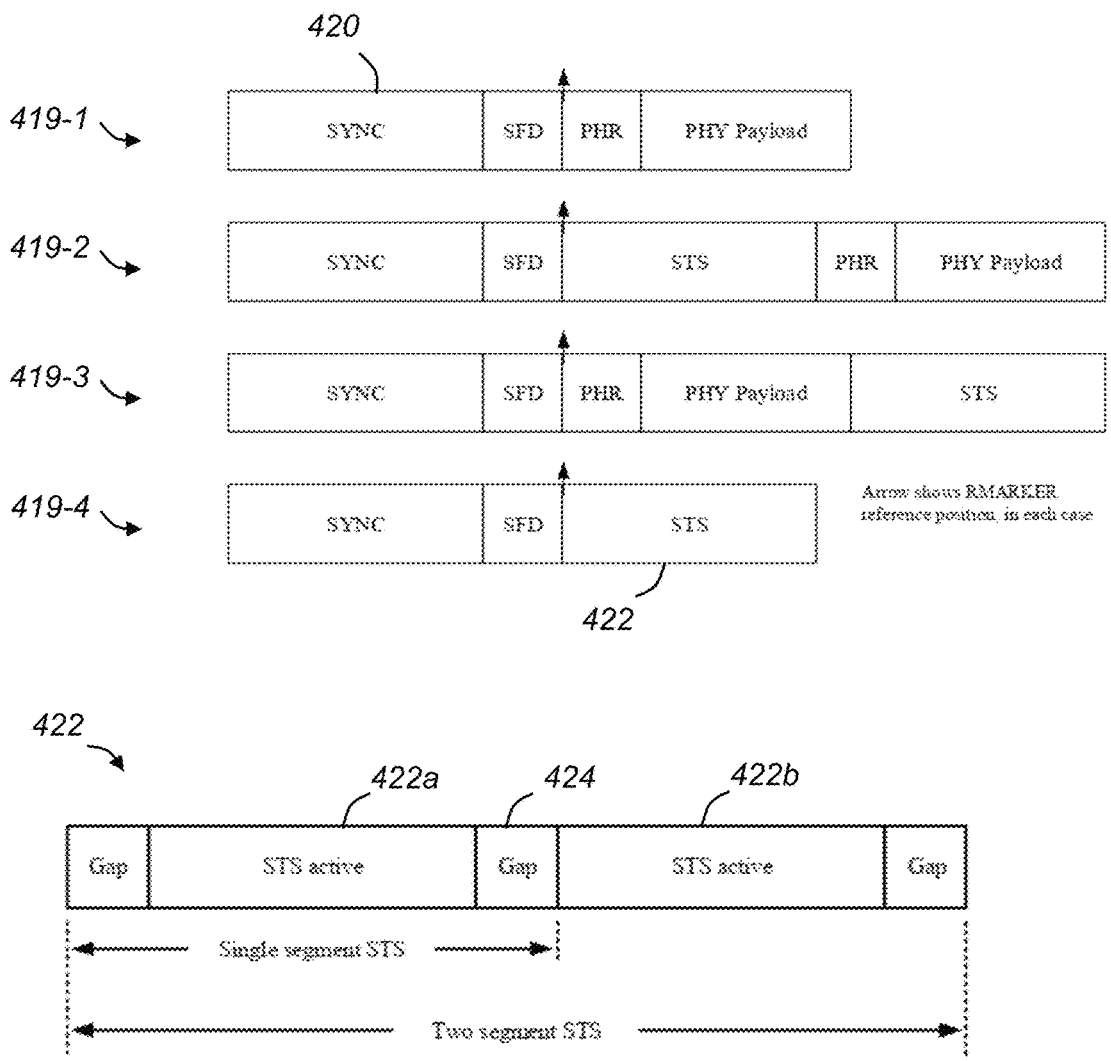
FIG. 4 illustrates packet structures suitable for use in a receive path according to an embodiment.

FIG. 4 illustrates packet structures 419 suitable for use in a receive path according to an embodiment. The packet structures 419 illustrated are ultra-wide-band packet structures according to IEEE 802.15.4z although the disclosure is not limited thereto.

First to fourth STS packet configurations 419-1, 419-2, 419-3, 419-4 are illustrated, referred to collectively as packet structures 419. Each packet structure 419 comprises a synchronisation field, SYNC, 420 (or synchronisation part). A receive path can use the synchronisation field 420 to determine whether a signal is present and to synchronize to that signal, for example to synchronize a local clock to that signal or to adjust the incoming signal to match the local clock. After the receive path detects the signal, a remaining part of the synchronisation field 420 can be integrated over multiple symbols to estimate a channel impulse response (CIR).

Some of the illustrated packet structures 419 also comprise a scrambled timestamp sequence (STS) field 422 which the receive path can also integrate to form a CIR. The STS field 422 can be used in ranging applications to determine a distance between two devices in a secure manner. In some examples, the STS field 422 can be optionally split into multiple segments 422a, 422b, as shown in the lower part of FIG. 4. The STS field 422 comprises a gap 424 between the segments 422a, 422b, in which no data is transmitted. The gap may be on the order of 1 μs.

Receive paths of the present disclosure are configured to receive a first portion of a packet from a first antenna and a second portion of the packet from a second antenna. As explained further below, the first and second antenna may form part of a receiver system comprising the receive path 312 or the first and second antenna may form part of the transmitter from which the packet is received. Either way, antenna switching occurs between the first portion and the second portion of the packet. For example, a receiver system may switch between a first and second antenna of the receiver system between receipt of the first portion and receipt of the second portion. Alternatively, a transmitter may switch between a first and second antenna of the transmitter between transmission of the first portion and transmission of the second portion. The antenna switching can take a time on the order of 0.1-1 μs. The packet structures 419 of FIG. 4 can facilitate this antenna switching as the antenna switching can occur during a non-critical data portion of the packet, such as the synchronisation field 420 or the gap 424. For example, for STS configuration three 419-3, the antenna switching can occur: (i) in the gap between the start of frame delimiter (SFD) and the STS field 422; or (ii) in the gap 424 between STS segments 422a, 422b. These switching points can allow for simple and defined processing in the receiver and result in one CIR estimate for the synchronisation field 420 and one CIR for each STS segment 422a, 422b. If required, antenna switching can still occur at other points in the packet structure 419.

The receive paths and receiver systems disclosed herein are not limited to use with the packet structures of FIG. 4. Any packet structure for which the receive path can estimate multiple CIRs can be used. For example, a packet structure with a long sync part in which the antenna switching can happen may be suitable.

Returning to FIG. 3, operation of the receive path 312 to determine an angle of arrival of a received packet will now be described. A packet structure with a first portion, such as a synchronisation field, and a second portion, such as a STS field, such as those of FIG. 4 will be referred to as the received packet.

In this example, the processing unit 314 comprises a mixer 326 and a correlator 328. The mixer 326 receives a first portion of the packet from the first antenna. In this example, the first portion comprises a synchronisation field. The first portion may further comprise further first fields. The mixer 326 also receives a carrier estimate signal from the tracking module 316. Initially, the carrier estimate signal may be zero as no frequency or phase offset information is available. A goal of the mixer 326 is to adjust or correct the received signal such that imaginary components of the signal approach zero. In other words, the mixer 326 corrects the carrier frequency offset and/or phase error for coherent demodulation for better sensitivity. The mixer 326 adjusts the synchronisation field based on the carrier estimate signal to provide a corrected synchronisation signal. The corrected synchronisation signal is an example of a first corrected signal. Initially, with the carrier estimate signal set to zero, the corrected synchronisation signal may equal the received synchronisation field.

The correlator 328 receives the corrected synchronisation signal from the mixer 326 and correlates the signal with an expected code sequence to provide a correlated synchronisation signal. The correlated synchronisation signal is an example of a first correlated signal. The expected code signal can be a predetermined code sequence used by both transmitter and receiver to perform an angle of arrival calculation.

In this example the tracking module 316 comprises a demodulator 330, a carrier tracking module 332 and a signal detection module 334. Before a packet is received, the signal detection module 334 is enabled while the demodulator 330 and phase calculation module 318 are disabled. The signal detection module 334 receives a correlated signal from the correlator 328. The signal detection module 334 analyses the correlated signal to determine the strongest path in the signal and determine whether a packet has been received.

A tracking loop may be defined as comprising the processing module 314 and the tracking module 316. On a first pass of the tracking loop, the signal detection module 334 receives the correlated synchronisation signal from the correlator 328 and determines that a signal is present. In response, the signal detection module 334 activates or enables the demodulator 330 and the phase calculation module 318. The signal detection module 324 also provides a coarse frequency estimate to the carrier tracking module 332. The carrier tracking module 332 updates the carrier estimate signal based on the coarse frequency estimate. In this way, the tracking module 316 receives a first correlated signal and updates the carrier estimate signal based on the first correlated signal.

On a second pass of the tracking loop, the mixer 326 continues to receive (subsequent symbols of) the synchronisation field and corrects the synchronisation field with the updated carrier estimate signal. The correlator 328 correlates the corrected synchronisation signal and provides an updated correlated synchronisation signal to the demodulator 330. The demodulator 330 demodulates the correlated synchronisation signal and provides demodulation symbols to the carrier tracking module 332. The carrier tracking module 332 further updates and refines the carrier estimate signal based on the demodulation symbols and provides the carrier estimate signal to the mixer 326. In this way, the tracking module 316 continues to receive the first correlated signal and update the carrier estimate signal. The tracking loop continues to operate/iterate during receipt of the first portion (synchronisation field) and derive the frequency and/or phase error(s) with greater accuracy which is used by the mixer 326 to further correct and phase align the received first portion.

As outlined above, the receive path 312 is configured to receive a first portion of a packet from a first antenna and a second portion of the packet from a second antenna. The first portion of the packet may comprise: the synchronisation field; the synchronisation field and a further first field, for example an SFD field; or a first part of the synchronisation field. The second portion may comprise: a further second field subsequent to the synchronisation field, for example a STS field, or a second part of the synchronisation field.

Following receipt of the synchronisation field, or the first part of the synchronisation field, antenna switching occurs and the receive path 312 receives a second portion of the packet from the second antenna. As described above, the antenna switching may occur during the synchronisation field or during a gap between the first portion and the second portion of the packet. The receive path 312 may be configured to disable the tracking module 316 following receipt of the first portion and prior to receipt of the second portion. The receive path 312 may be configured to disable the tracking module to coincide with receipt of a part of the packet at which antenna switching occurs. The receive path 312 may disable (or pause or freeze) the tracking module 316 such that the carrier estimate signal is fixed to its current value and is no longer updated. In this way, the receive path 312 may be configured to: enable the tracking module 316 during receipt of the first portion such that the tracking module 316 is configured to update the carrier estimation signal; and disable the tracking module 316 prior to receipt of the second portion such that the carrier estimate signal remains constant during receipt of the second portion.

The receive path 312 receives the second portion of the packet from the second antenna at the mixer 326. The mixer 326 receives the carrier estimate signal that is now a fixed value that was calculated for the first portion, for example for the synchronisation field. In other words, the carrier estimate signal is no longer updating because the tracking module 316 and tracking loop are disabled. This is necessary because the receive path 312 needs to determine a phase difference between the first and second portions of the packet received from respective antennas. If the tracking loop was not frozen when switching antennas, the tracking module 316 would continue to update the carrier estimate signal and the phase difference information between the first and second antennas would be lost. In such a scenario, both CIRs would show a phase of roughly 0 as the phase error is always corrected.

The mixer 326 adjusts/corrects the second portion based on the carrier estimate signal calculated for the first portion (synchronisation field in this example), to provide a second corrected signal. The correlator 328 correlates the second corrected signal to provide a second correlated signal.

The phase calculation module 318, implemented as a binning unit in this example, is configured to: receive a first correlated signal, corresponding to a first portion of the packet from the first antenna, and determine a first carrier phase; and receive a second correlated signal, corresponding to the second portion of the packet from the second antenna, and determine a second carrier phase. The phase calculation module 318 can then determine the angle of arrival of the packet based on the phase difference between the first carrier phase and the second carrier phase.

The phase calculation module 318 may determine a first and second CIR based on the respective first and second correlated signals. The phase calculation module 318 may integrate the first and second correlated signals to determine the respective first and second CIRs. The phase calculation module may determine first and second path samples based on the respective first and second CIRs using a path detection algorithm. The phase calculation module 318 can determine the first and second carrier phases from the respective first and second path samples.

When the tracking loop is frozen (tracking module 316 disabled), the carrier estimation signal provided by the tracking module 316 may have a residual frequency error due to non-ideal phase error estimation and noise. This residual frequency error can correspond to a residual error of the receive path (tracking module 316) in estimating the carrier frequency offset ($f_{cfo}$)—a carrier frequency offset estimation error, $f_{cfoe}$. This residual frequency error is then applied to the second portion of the packet. As time progresses, the residual frequency error can result in a phase error in the received signal. The phase calculation module 318 can accumulate this phase error when integrating the second correlated signal to estimate the second CIR.

Here we consider a second portion of a packet comprising an STS field as described above in relation to FIG. 4. We define the term STS symbol with a length determined by the length of the integration accumulator in the phase calculation module 318, i.e. how many pulses can be added up to estimate the STS. For example, if the STS field has a total length of 32 μs (rounded for simplicity) and the phase calculation module 318 has an accumulator which can sum 1 μs long parts of the STS field, the STS field is considered to have 32 STS symbols. The phase calculation module 318 can integrate the STS field to provide an estimated CIR with a length of 1 μs (as the 1 μs STS symbols are summed).

Figure 5:
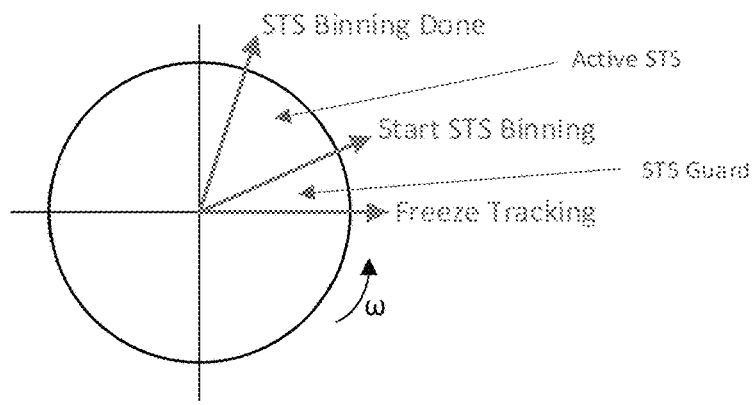
FIG. 5 illustrates the interpretation of residual frequency error in the phasor domain.

FIG. 5 shows how the residual frequency error can be interpreted in the phasor domain. For simplicity it is assumed that when the tracking loop is frozen, the phase error is at 0°. During an STS guard (corresponding to a STS gap in FIG. 4), the received signal rotates by an additional phase error depending on the residual frequency error. As the phase calculation module integrates the STS field, the received signal keeps rotating by an additional phase error depending on the residual frequency error. For every STS symbol integrated by the phase calculation module, the STS field rotates further and adds to the total phase error. Therefore, the phase error for the last STS symbol, STS symb N, will be much greater (N times greater) than the phase error for the first STS symbol, STS symb 1.

Figure 6:
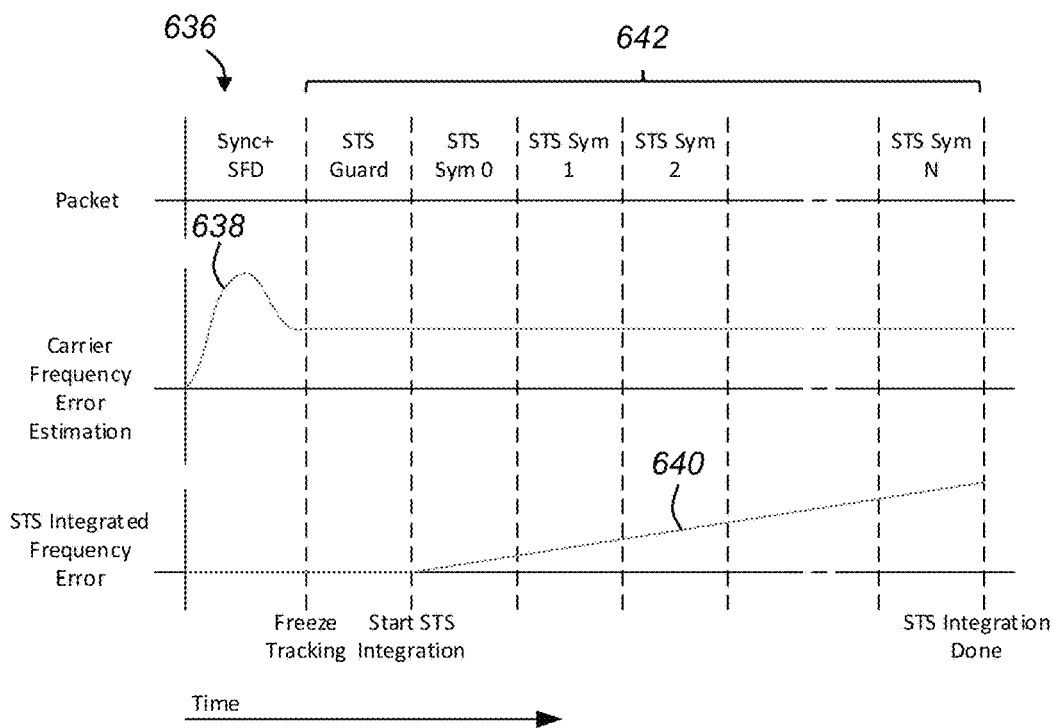
FIG. 6 illustrates the accumulation of phase error in an example embodiment.

The accumulation of phase error during the second portion is further illustrated in FIG. 6. In this example the first portion 636, received from the first antenna, comprises a synchronisation field. The second portion, received from the second antenna, comprises a STS field comprising a STS guard and a plurality of STS symbols (STS Sym 0 . . . STS Sym N). The STS guard may correspond to a gap at the start of the STS field (see FIG. 4). During the first portion, the tracking module and tracking loop are enabled and the tracking module updates the carrier estimate signal 638. The value of the carrier estimate signal 638 fluctuates during the first portion as the phase error approaches zero. Antenna switching may occur during the SFD field. The receive path disables the tracking module, thereby freezing the tracking, prior to receipt of the second portion 642. As a result, the value of the carrier estimate signal remains fixed to the last value calculated while the tracking module was enabled.

The phase calculation module integrates the second portion 642 to determine the second CIR. The phase calculation module integrates the STS symbols of the STS field 642. The phase calculation module also integrates the phase error, resulting from the residual frequency error of the tracking loop, when integrating the STS symbols. The phase error is a linearly increasing STS integrated phase error 640. As a result, the phase calculation module can rotate the second CIR by the integrated phase error leading to an inaccurate determination of the second carrier phase. The phase calculation module can correct the phase error by applying a correction factor, $S_{corr}$, to the second CIR. The correction factor, $S_{corr}$, may comprise a complex multiplication factor with an amplitude of 1 and a correction phase value. In the example of FIGS. 5 and 6, the correction factor should compensate the phase error resulting from the rotation of the phase during the STS guard and the integrated phase error arising during integration of the STS symbols.

Figure 7:
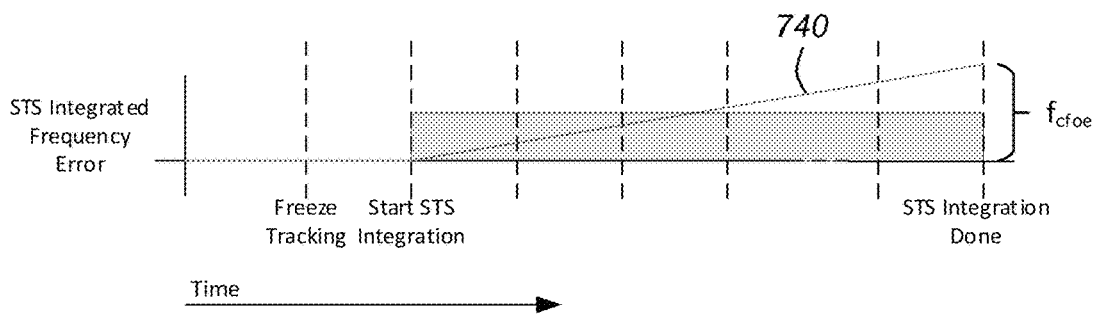
FIG. 7 further illustrates the accumulation of phase error in an example embodiment.

A derivation of the correction factor, $S_{corr}$, can be understood from FIG. 7, which illustrates the integrated error of FIG. 6. The integration of the phase error 740 over time by the phase calculation module is represented as a ramp function. As the phase calculation module integrates the STS symbols, the residual frequency error can rotate the received signal with a frequency corresponding to a carrier frequency offset error estimation, $f_{cfoe}$. The area below the ramp is the error value required for the correction factor and can be calculated as:

$$A = \tfrac{1}{2} f_{cfoe} t_{STS}$$

where $t_{STS}$ is the STS field duration, a known value. The receive path may estimate the carrier frequency offset error estimation, $f_{cfoe}$, (the residual frequency error) as discussed further below. The factor ½ accounts for the variation in phase error for each of the STS symbols (the first STS symbol has a much smaller phase error than the last STS symbol). The error correction factor, $S_{STS}$, of the field itself can be computed using the area value as:

$$S_{sts} = e^{j2\pi 1/2 f_{cfoe} t_{STS}}$$

The correction factor for the STS guard, $S_{Guard}$, corresponds to a simple phase rotation resulting from the carrier frequency offset error and can be calculated as:

$$S_{guard} = e^{j2\pi f_{cfoe} t_{Guard}}$$

where $t_{Guard}$ is a duration of the STS Guard.

The total correction factor, $S_{corr}$, is calculated as:

$$S_{corr} = S_{Guard} * S_{sts} = e^{j2\pi f_{foe}(t_G + 1/2 t_{STS})}$$

In some examples, the second portion may comprise an $n^{th}$ STS segment. In other examples, the receive path may be configured to receive a further portion from a further antenna. Therefore, the receive path should be able to correct for the phase error at any STS segment. In such examples, the correction factor, $S_{corr}$, can be extended to consider the rotation of all previous STS segments. In the previous STS segments a simple phase rotation occurs. In the $n^{th}$ segment the phase calculation module integrates the phase error. Therefore, the correction factor for the $n^{th}$ segment, $S_{corr,n}$, can be calculated using:

$$\rho_n = 2\pi f_{cfoe} \left( \sum_{i=1}^{n-1} (t_{G,i} + t_{STS,i}) \right) * \left( t_G + \tfrac{1}{2} t_{STS} \right)$$

$$s_{corr,n} = e^{j\rho_n}$$

where n−1 is the number of segments before the current segment, n, and $t_{G,i}$ and $t_{STS,i}$ are the guard and segment durations of the STS segments i. Typically, all segments will have the same duration but for general validity the index i is added.

Depending on the antenna and packet configuration, the phase calculation module can multiply the correction factor, $S_{corr}$, by the corresponding CIR or complex path sample. The first portion may comprise the synchronization field and the tracking module may be configured to update the carrier estimate signal based on a corresponding correlated synchronization signal. In some examples the phase calculation module may determine the first carrier phase based on the correlated synchronization signal. In other examples, the first portion may further comprise a further first field and the phase calculation module may determine the first carrier phase based on a respective further first correlated signal.

Example configurations may include:

Sync Field+STS Field

In this example, the first portion comprises a synchronization field and the second portion comprises a STS field. The tracking module updates the carrier estimation signal based on the correlated synchronization signal. The phase calculation module determines the first CIR and first phase based on the correlated synchronization signal. During receipt of the synchronization field, the tracking loop is enabled and no phase correction is required. Prior to receipt of the second portion, the tracking loop is disabled and a correction factor, $S_{corr}$, is required for the second CIR.

Sync+2×STS Segments

In one example, the first portion comprises the synchronization field and the second portion comprises first and second STS portions. All three fields are used to determine respective CIRs to support the angle of arrival estimation. The CIR determined based on the synchronization field does not require correction because the tracking loop is enabled. The tracking is disabled prior to receipt of the first STS segment. Therefore, the CIR of the first STS segment requires correction by factor $S_{corr,1}$, and the CIR of the second STS segment requires correction by factor $S_{corr,2}$.

In a further example, the first portion comprises the synchronization field and the first STS field and the second portion comprises the second STS field. The synchronization field is only used for signal detection and carrier correction. The tracking loop is disabled after receipt of the synchronization field but prior to both STS segments. The first and second STS segments are used to determine respective first and second phases. The first CIR corresponding to the first STS segment requires correction by factor $S_{corr,1}$, and the second CIR corresponding to the second STS segment requires correction by factor $S_{corr,2}$.

The above configurations are just examples, the procedure can be extended to multiple STS segments.

As mentioned above, the receive path may determine the residual frequency error, for example, the carrier frequency offset estimation error, $f_{cfoe}$, i.e. the residual error that the receiver has when estimating the carrier frequency offset, $f_{cfo}$. The receive path may determine the carrier frequency offset estimation error based on a reference.

In one example, a reference packet or synchronization packet (distinct from the synchronization field of the AoA packet) can be exchanged prior to transmission of the packet used for angle of arrival estimation. The synchronization packet may be a UWB synchronization packet. The synchronization packet can be any packet which the receive path can receive and perform a carrier frequency offset estimation. The receiver/receive path can estimate the combined carrier frequency offset of both transmitter and receiver, denoted as a reference carrier offset, $f_{sync}$. In this way, the receive path is configured to: receive a reference packet prior to the AoA packet, determine a reference carrier frequency offset based on the reference packet; and determine the residual frequency error based on the reference carrier frequency offset.

The receiver can adjust an analog front end of the receiver to account for the reference carrier frequency offset, $f_{sync}$. As a result, the estimation of the carrier frequency offset, $f_{cfo}$, determined by the receive path during the packet for angle of arrival estimation equals the carrier frequency offset estimation error, $f_{cfoe}$, which is required to calculate the correction factor. As a result, $f_{cfoe}=f_{cfo}$ can be substituted into the formulas outlined above for the correction factor, $S_{corr}$. As the receiver adjusts the analog front end by the reference carrier frequency offset, $f_{sync}$, the tracking module should determine a carrier frequency offset of zero, during the AoA packet. However, during the AoA packet, the tracking loop may adjust the frequency and phase with less precision than during the synchronization packet. Any residual carrier frequency offset, $f_{cfo}$, determined by the tracking module will be equal to the error in the estimation—the carrier frequency offset estimation error, $f_{cfoe}$. In this way, the receive path adjusts a frequency of the analog front end by the reference carrier frequency offset, $f_{sync}$, and the tracking module determines the residual frequency offset, $f_{cfoe}$, as a carrier frequency offset, $f_{cfo}$, of the first correlated signal.

Instead of adjusting the analog front end, the receive path can store the reference carrier frequency offset, $f_{sync}$. The receive path can then determine the carrier frequency offset estimation error, $f_{cfoe}$, (the residual frequency offset error) as a difference between the reference carrier frequency offset and a carrier frequency offset, $f_{cfo}$, of the first correlated signal determined by the tracking module during the AoA packet ($f_{cfoe}=f_{cfo}-f_{sync}$). As a result, the above general formula is modified as follows:

$$\rho_n = 2\pi(f_{cfo} - f_{sync})\left(\sum_{i=1}^{n-1}(t_{G,i} + t_{STS,i})\right) * \left(t_G + \frac{1}{2}t_{STS}\right)$$

$$s_{corr,n} = e^{j\rho_n}$$

For example, if the reference carrier frequency offset, $f_{sync}$, is 10 ppm and the tracking module determines the carrier frequency offset, $f_{cfo}$, of the first correlated signal as 10.1 ppm, the residual frequency error, $f_{cfoe}$, is 0.1 ppm.

Figure 8:
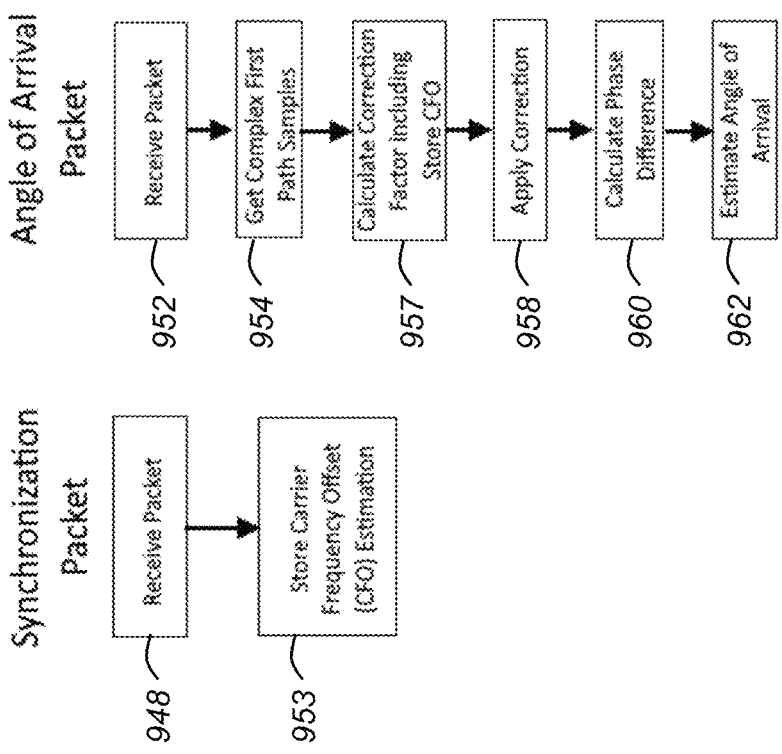
FIG. 8 illustrates a process of a receive path receiving a reference packet prior to an angle of arrival packet according to an embodiment of the present disclosure.

FIG. 8 illustrates a process of a receive path receiving a reference packet prior to an angle of arrival packet according to an embodiment of the present disclosure.

At step 848, the receive path receives the reference packet from a transmitter. At step 850, the receive path estimates the reference carrier frequency offset between the transmitter and the receiver of which the receive path forms part. At step 851, the receive path adjusts the analog front end by a frequency equal to the reference carrier frequency offset.

At step 852, the receive path receives an angle of arrival packet from a first antenna and a second antenna (as described above). The angle of arrival packet originates from the transmitter that transmitted the reference packet. At step 854, the receive path estimates the complex path samples as described above. At step 856 the receive path calculates the correction factor based on the residual frequency error equal to the carrier frequency offset determined by the tracking loop for the AoA packet. At step 858, the receive path applies the correction factor to path samples for which the tracking loop was disabled. At steps 860 and 862, the receive path calculates the phase difference between the first portion and second portion of the AoA packet received from the first and second antennas and estimates the corresponding angle of arrival.

Figure 9:
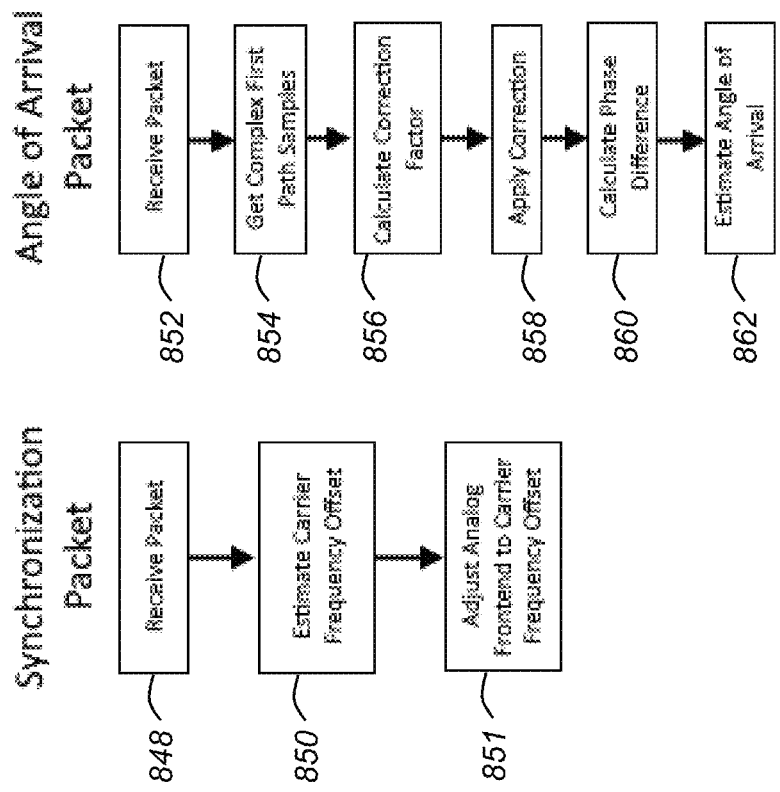
FIG. 9 illustrates a further process of a receive path receiving a reference packet prior to an angle of arrival packet according to an embodiment of the present disclosure.

FIG. 9 illustrates a further process of a receive path receiving a reference packet prior to an angle of arrival packet according to an embodiment of the present disclosure. Steps of the process of FIG. 9 that also occur in FIG. 8 have been given corresponding reference numbers in the 900 series and will not necessarily be described again here.

The process of FIG. 9 is substantially similar to the process of FIG. 8 with the following exceptions. At step 953, the receive path stores the reference carrier frequency offset instead of adjusting the analog front end. At step 957, the receive path applies the stored reference carrier frequency offset to the calculation of the correction factor.

Figure 10:
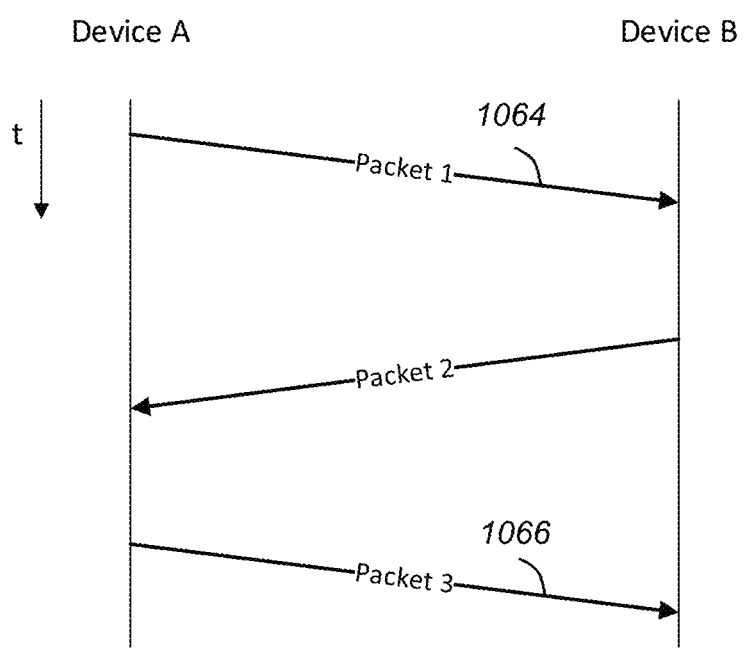
FIG. 10 illustrates a double-sided ranging process that can implement the processes of FIGS. 8 and 9.

FIG. 10 illustrates a double-sided ranging process that can implement the processes of FIGS. 8 and 9.

FIG. 10 illustrates packet exchange over time for double-sided ranging. This principle can be used for accurate ranging. As illustrated, a second device, Device B, receives a first packet 1064 and a third packet 1066 from a first device, Device A. Therefore, a receive path at device B could receive the first packet as the reference/synchronization packet and receive the third packet as the AoA packet. In some examples, before the first packet, another packet (not illustrated) can be transmitted by the first device to the second device to exchange data and indicate that the ranging procedure starts. Such a packet can also be used as the reference packet and both the first packet and third packet can then be used as AoA packets for angle of arrival estimation. As illustrated, the second device may transmit a second packet back to the first device as part of the ranging process and to acknowledge receipt of the first packet 1064.

Double-sided ranging is already used for localization or positioning systems. Therefore, the disclosed received paths and angle of arrival estimation algorithms can be advantageously implemented in these systems with low effort to provide the angle of arrival as an additional input to the system and increase the system performance.

In yet further examples, the receive path can determine the residual frequency error without receiving the earlier reference packet. For example, a transmitter can measure its own offset and transmit the measured offset as part of a payload of the AoA packet. The receiver/receive path can also measure its own offset. The total offset may comprise the reference carrier frequency offset and can be determined from the received transmitter offset and the receivers own measured offset. In this way, the receive path may be configured to: receive a transmitter carrier frequency offset from a transmitter; determine a receiver carrier frequency offset; determine the reference carrier frequency offset based on the transmitter carrier frequency offset and the receiver carrier frequency offset; and determine the residual frequency error based on the reference carrier frequency offset. For example, the receive path may adjust an analog front end or store the reference carrier frequency offset as described above.

In some examples, both the transmitter and the receiver may have very accurate crystal oscillators as clock sources, i.e. the expected total frequency offset causes angle of arrival estimation errors in an acceptable range for the application, exchanging offset information might not be required. Also, if the offsets on both sides are known beforehand no exchange of offset information is required. In such an example, the known reference carrier frequency offset still has to be applied to the correction factor via adjusting the analog front end or storing the reference value as described above.

Figure 11:
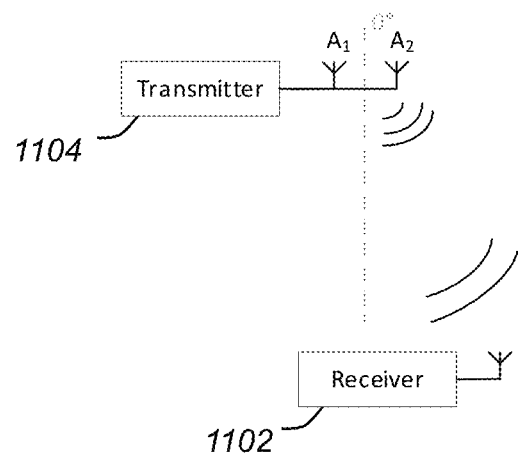
FIG. 11 illustrates a two-antenna transmitter and a one antenna receiver comprising a receive path according to an embodiment.

It will be understood that the receive path may receive the first and second portion of the packets from either: (i) respective first and second receive antennas coupled to the receiver that both receive the AoA from a transmitter (see FIGS. 1 and 2); or (ii) respective first and second transmit antennas coupled to a transmitter that transmits the AoA packet to the receiver, as illustrated in FIG. 11. In other words, the antenna switching can occur on both the transmit-side and the receive side.

Antenna switching at the receive side can be understood by the description above and the receive path can switch coupling between the antennas to coincide with the freezing of the tracking loop. In this way, the receive path can be configured to receive the first portion of the packet from a first receive antenna and the second portion of the packet from a second receive antenna. The receiver comprising the receive path and the first and second receive antenna may be configured to switch a coupling of the receive path from the first receive antenna to the second receive antenna. The receiver may be configured to switch the coupling between the first portion of the packet and the second portion of the packet. The receiver may be configured to switch the coupling in response to disabling of the tracking module.

Turning to the two-antenna transmitter configuration of FIG. 11, the antenna switching occurs at a transmitter 1104. The transmitter comprises a first transmit antenna, A1, and a second transmit antenna, A2. Referring to the UWB packet configuration as an example, the transmitter 1104 can switch antennas during or after the SFD. In this way, the first antenna transmits the synchronization field and the SFD field as a first portion and the second antenna transmits the STS field as a second portion. In this way, the receiver 1102 comprises a receive path configured to receive a first portion of a packet (sync+SFD) from the first transmit antenna and a second portion of a packet (STS) from the second transmit antenna. In this example, the receiver 1102 comprises a single antenna and therefore does not have to do any antenna switching. However, the receive path still freezes the tracking loop prior to receiving the second portion and applies the correction factor as described above. Therefore, the only difference to a system with two receive antennas and one transmit antenna is that the antenna switching occurs at the transmitter side. The receive path is functionally the same. Therefore, the disclosed receive path can advantageously provide AoA determination at receiver with only one antenna.

Figure 12:
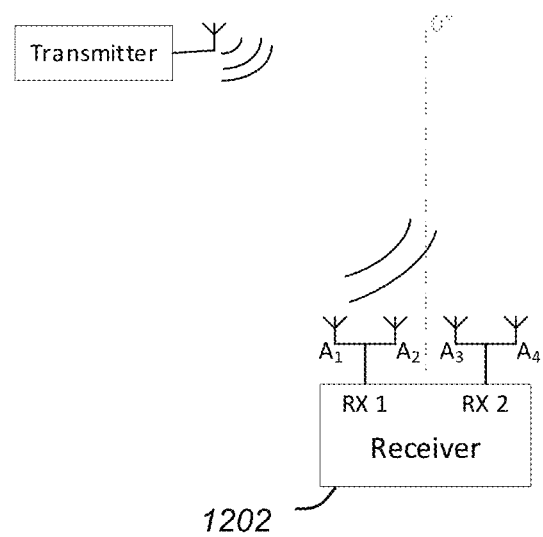
FIG. 12 illustrates an example receiver system comprising first and second receive paths according to an embodiment of the present disclosure.

In one or more examples, there may be provide a receiver system comprising multiple physical receive paths where each receive path is configured to receive different portions of a packet from different antennas. FIG. 12 illustrates an example receiver system 1202 comprising first and second receive paths, RX1, RX2, according to an embodiment of the present disclosure. In this example, each receive path, RX1, RX2, is coupled to two respective receive antennas.

Both the first and second receive paths commence signal detection at the same time with each receive path coupled to one of its antennas, e.g. the first receive path uses a first antenna and the second receive path uses a third antenna. In some examples, the receive path that detects a signal first, will become a master receive path and assume responsibility for carrier frequency offset estimation and the carrier correction. The tracking loop of the other receive path may be disabled. The other receive path then applies the same carrier frequency and phase correction in order to keep the phase relationship between the two receive paths. Both the first and second receive paths integrate a first portion (eg synchronization field) of the packet for estimation of a corresponding synchronization CIR. Both receive paths switch the antenna, i.e. the first receive path uses a second antenna and the second receive path uses a fourth antenna to receive the second portion. The tracking loop of the master receive path is disabled prior to receiving the second portion. Both the first and second receive paths estimate the second CIR. In this way, a total of four complex phase samples is available and can be used for angle of arrival estimation. Depending on the antenna locations, the four phase values can be used for e.g. 3-D angle estimation (azimuth and elevation).

The correction factor, $S_{corr}$, as described above can be applied to the two complex path samples of the second CIRs in the same way as described above for a single receive path. For the correction factor calculation, the carrier frequency offset estimation of the receive path that detected the signal and controls the carrier correction can be used.

The disclosed receive paths and receiver systems can provide an estimation of angle of arrival in the time-domain in a system where the number of physical receive chains is smaller than the number of antennas. In addition, the estimation procedure can advantageously tolerate large carrier frequency offsets and is limited only by the receiver performance.

This disclosed receive paths and receiver systems can provide estimation of angle of arrival in an UWB system in the time-domain. A number of physical receive paths can be less than the number of receive antennas. The receive path can be incorporated into existing ranging systems to provide angle of arrival as additional input for a localization engine.

The disclosed receive paths and receiver systems allow estimation of the angle of arrival (direction of arrival) for an Ultra-Wideband (UWB) receiver from a received UWB packet in case the number of physical receive paths is less than the number of receive antennas. The estimation can be provide in the time domain not requiring any Fourier transform and also works reliably when a carrier frequency offset between transmitter and receiver is present.

The angle of arrival estimation can be based upon a receiver structure in which it is assumed that the carrier phase error of the received signal is corrected before the correlation. The corrected signal can be correlated and a complex channel impulse response (CIR) estimated by integration of the correlated signal. At least two CIRs can be estimated from different antennas which are active during different periods of the received UWB packet. Not all antennas are actively receiving all the time, i.e. the antennas are switched during reception.

From the complex CIRs, the first path samples can be determined using a first path detection algorithm. From the first path samples the phases of the carrier can be determined and the phase difference of arrival calculated. With the phase difference the angle of arrival can be estimated. Due to the antenna switching and the fact that the number of physical receive paths is less than the number of antennas, a correction of the estimated phase values may be applied.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled. In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. A receiver comprising:
    a processing module configured to:
        receive a first portion of a packet of a received signal from a first antenna;
        receive a carrier estimate signal;
        adjust a frequency and/or a phase of the first portion based on the carrier estimate signal to provide a first corrected signal; and
        correlate the first corrected signal with an expected code sequence to provide a first correlated signal;
    a tracking module configured to:
        receive the first correlated signal; and
        update the carrier estimate signal based on the first correlated signal,
    wherein the processing module is further configured to:
        receive a second portion of the packet from a second antenna;
        receive the carrier estimate signal based on the first correlated signal;
        adjust a frequency and/or a phase of the second portion based on the carrier estimate signal to provide a second corrected signal; and correlate the second corrected signal with the expected code sequence to provide a second correlated signal, and wherein a receive path further comprises a phase calculation module configured to:
receive the first correlated signal and determine a first carrier phase based on the first correlated signal;
receive the second correlated signal and determine a second carrier phase based on the second correlated signal; and
determine an angle of arrival of the packet of the received signal based on the first carrier phase and the second carrier phase;

wherein the receiver is further configured to:
enable the tracking module during receipt of the first portion such that the tracking module is configured to update the carrier estimation signal; and
disable the tracking module prior to receipt of the second portion such that the carrier estimate signal remains constant during receipt of the second portion.

2. The receiver of claim 1, wherein the phase calculation module is configured to:
determine a first channel impulse response, CIR, based on the first correlated signal and a second CIR based on the second correlated signal;
determine a first path sample based on the first CIR a second path sample based on the second CIR; and
determine the first carrier phase based on the first path sample and determine the second carrier phase based on the second path sample.

3. The receiver of claim 1, wherein the phase calculation module is configured to apply a correction factor to the second carrier phase based on a residual frequency offset error of the tracking module.

4. The receiver of claim 3, wherein the receive path is configured to:
receive a reference packet prior to the packet of the received signal;
determine a reference carrier frequency offset based on the reference packet; and
determine the residual frequency offset error based on the reference carrier frequency offset.

5. The receiver of claim 3, wherein the receive path is configured to:
receive a transmitter carrier frequency offset from a transmitter;
determine a receiver carrier frequency offset;
determine a reference carrier frequency offset based on the transmitter carrier frequency offset and the receiver carrier frequency offset; and
determine the residual frequency error based on the reference carrier frequency offset.

6. The receiver of claim 4, wherein:
the receive path is configured to adjust a frequency of an analog front end by the reference carrier frequency offset; and
the tracking module is configured to determine the residual frequency offset error as a carrier frequency offset of the first correlated signal.

7. The receiver of claim 4, wherein the receive path is configured to:
store the reference carrier frequency offset; and
determine the residual frequency offset error as a difference between a carrier frequency offset of the first correlated signal and the reference frequency offset.

8. The receiver of claim 1 wherein:
the first portion comprises a synchronization field and the first correlated signal respectively comprises a correlated synchronization signal; and
the tracking module is configured to update the carrier estimate signal based on the correlated synchronization signal.

9. The receiver of claim 1, configured to:
receive the first portion of the packet from a first receive antenna coupled to the receive path and receive the second portion of the packet from a second receive antenna coupled to the receive path; or
receive the first portion of the packet from a first transmit antenna of a transmitter configured to transmit the packet and receive the second portion of the packet from a second transmit antenna of the transmitter.

10. The receiver of claim 1, further comprising the first antenna and the second antenna.

11. The receiver of claim 10, configured to switch a coupling of the receive path from the first antenna to the second antenna prior to receipt of the second portion of the packet.

12. A method for calculating an angle of arrival of a received signal comprising:
receiving a first portion of a packet of the received signal from a first antenna;
receiving a carrier estimate signal;
adjusting a frequency and/or a phase of the first portion based on the carrier estimate signal to provide a first corrected signal;
correlating the first corrected signal with an expected code sequence to provide a first correlated signal;
update the carrier estimate signal based on the first correlated signal during receipt of the first portion,
receiving a second portion of the packet from a second antenna, the carrier estimate signal remaining constant during receipt of the second portion;
receiving the carrier estimate signal based on the first correlated signal;
adjusting a frequency and/or a phase of the second portion based on the carrier estimate signal to provide a second corrected signal;
receiving the first correlated signal and determine a first carrier phase based on the first correlated signal;
receiving the second correlated signal and determine a second carrier phase based on the second correlated signal; and
determining an angle of arrival of the packet of the received signal based on the first carrier phase and the second carrier phase.

* * * * *